United States Patent [19]

Kawaoka et al.

[11] Patent Number: 5,075,775
[45] Date of Patent: Dec. 24, 1991

[54] METHOD AND APPARATUS FOR CONTROLLING ELECTRONIC SHUTTER

[75] Inventors: Yoshiki Kawaoka; Takashi Ebato; Masahiro Konishi, all of Tokyo, Japan

[73] Assignee: Fuji Photo Film Co., Ltd., Kanagawa, Japan

[21] Appl. No.: 618,890

[22] Filed: Nov. 28, 1990

[30] Foreign Application Priority Data

Nov. 30, 1989 [JP] Japan .................................. 1-311811

[51] Int. Cl.⁵ ........................ H04N 5/30; H04N 3/14; H04N 5/335
[52] U.S. Cl. ................................ 358/209; 358/213.13
[58] Field of Search ................... 358/209, 213.13, 909, 358/228

[56] References Cited

U.S. PATENT DOCUMENTS

| | | | |
|---|---|---|---|
| 4,556,912 | 12/1985 | Yamanaka et al. | 358/228 |
| 4,574,309 | 3/1986 | Arisawa et al. | 358/213.31 |
| 4,603,355 | 7/1986 | Yamada et al. | 358/213.13 |
| 4,800,435 | 1/1989 | Ikeda et al. | 358/213.26 |
| 4,963,980 | 10/1990 | Suga et al. | 358/209 |
| 5,003,398 | 3/1991 | Suzuki | 358/213.13 |

Primary Examiner—Howard W. Britton
Assistant Examiner—Wendy R. Greening

[57] ABSTRACT

An electronic shutter controlling method is provided for an electronic still video camera having a solid state imaging device, wherein a first field shift pulse is generated for discharging unnecessary charges from the solid state imaging device and for starting signal charge storage in accordance wth a determined exposure time, but is latched at intervals of the horizontal synchronizing signal, and the discharge of the unnecessary charges is started when the first shift pulse is latched. The timing of the start of the signal charge storage is therefore displaced by a half of the horizontal synchronizing signal period in the even field relative to the odd field, thereby making the charge storage time always N times as long as a horizontal synchronizing signal period.

8 Claims, 4 Drawing Sheets

METHOD AND APPARATUS FOR CONTROLLING ELECTRONIC SHUTTER

BACKGROUND OF THE INVENTION

The present invention relates to an electronic shutter for an electronic video camera, especially for a still video camera using an interlace scanning type image sensor.

As an imaging device for an electronic still camera, a CCD-type or MOS-type solid state imaging device such as an image sensor is used. Many of the image sensors adopt a frame interlace scanning system, whereby signal charges of one frame image are read out separately for each field, that is, an odd field and an even field. Using the frame interlace scanning system makes it possible to read the image not only in a frame storage mode but also in a field storage mode, so-called a pseudo frame storage mode which is where the signal charges of an odd field are mixed with those of an even field so as to improve the S/N ratio even when the subject brightness is low.

It is well-known in the art that when using such an image sensor in a camera, because the charge storage time of the image sensor is equivalent to the exposure time, a mechanical shutter can be omitted if only the charge storage time of the image sensor is controlled instead. The exposure control of the image sensor is performed such that upon a first field shift pulse unnecessary charges is swept away from the image sensor through a drain and, in that moment, the image sensor starts storing signal charges in an imaging portion for an appropriate time corresponding to the subject brightness, thereafter a second field shift pulse is input to transfer the signal charges at once to charge transfer channels of the image sensor, from which the signal charges are sequentially sent out of the image sensor in response to vertical transfer pulses and horizontal transfer pulses. The above charge storage time control is called electronic shutter control when exposure time control is performed.

Conventionally, the charge storage time is determined by selecting an optimum one of several predetermined time periods, for example, 1/60 sec., 1/125 sec., 1/250 sec., etc. In this type of exposure control method, however, it is difficult to adjust the exposure finely so that the above stepwise exposure control sometimes results in under-exposure or overexposure, this is conspicuous in an electronic still camera compared with a movie camera.

In order to solve this problem, it may be possible to make the increments of predetermined exposure times finer, but this solution will increase the number of control signal lines to be connected to an exposure control unit. As a result, the assembling of the circuit becomes complicated and the cost for a camera increases.

SUMMARY OF THE INVENTION

It is, therefore, an object of the present invention to provide a method for controlling charge storage time for an imaging device by which the charge storage time is not selected among predetermined stepwise different values, but the charge storage time is variable by an increment of a horizontal synchronizing signal period, that is, the charge storage time is always set N times as long as the horizontal synchronizing signal period (N is an integer), without the need for a large number of control signal lines.

Another object of the invention is to provide an apparatus for embodying the method of the invention.

To achieve the above object, according to the invention, in a method of controlling an electronic shutter for an electronic video camera in which a first operation for discharging unnecessary charges from a solid state imaging device is executed, and then a second operation for reading out signal charges having been stored in a solid state imaging device since the first operation is executed during a vertical scanning period so as to process the signal charges as a video signal, an external trigger signal for instructing the first operation is latched by latch pulses generated in synchronism with the horizontal synchronizing signal, and the first operation is started at the timing when the external trigger signal is latched. Accordingly, the timing of the first charge transfer is relatively displaced by a half of the horizontal synchronizing signal period between the even field and the odd field of the video signal.

Because the horizontal synchronizing signal is originally displaced by ½ phase relative to the vertical synchronizing signal in the even field compared with the odd field, and the reading of the signal charges starts in synchronism with a horizontal synchronizing signal, it becomes possible by latching the external trigger signal at the timing of the horizontal synchronizing signal, to set the exposure time N times as long as a horizontal synchronizing signal period independently of whether the external trigger signal is generated in an even or odd field. Furthermore, the timing of the external trigger signal may be determined with reference to the vertical synchronizing signal independently of whether it is to be generated in an odd or even field.

BRIEF DESCRIPTION OF THE DRAWINGS

Other objects and advantages of the invention will become apparent from the following detailed description when read in conjunction with the accompanying drawings, wherein.

DETAILED DESCRIPTION OF THE INVENTION

Figure 1:
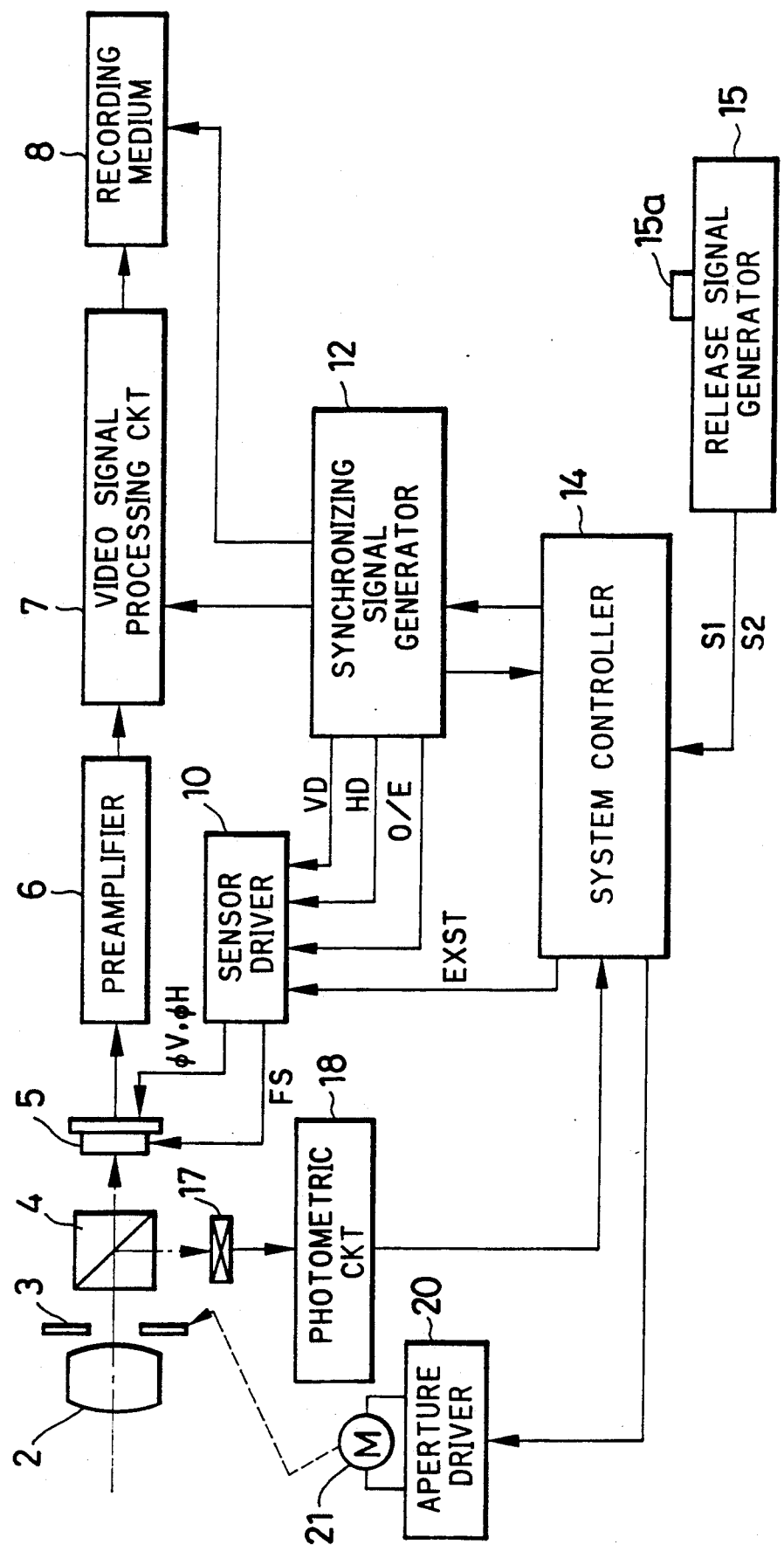
FIG. 1 is a block diagram showing an example of a controlling device for an electronic still camera embodying the invention.

FIG. 1 shows a construction of an electric circuit of an electric still camera. On a photo-electrical conversion surface of an image sensor 5 an optical image is formed by a taking lens 2 through an aperture 3 and a beam splitter 4. The image sensor 5 is constituted by a well-known CCD-type solid state imaging device which has a matrix array of pixels arranged on the photo-electrical conversion surface The optical image is photo-electrically converted and stored as the charge signals in the respective pixels.

The image sensor 5 is connected to a preamplifier 6, a video signal processing circuit 7, and a recording device 8, in this order. The preamplifier 5 amplifies the photo-electric signal from the image sensor 6 at the first stage and sends it to the video signal processing circuit 7. The video signal processing circuit 7 comprises a gain control amplifier, a gamma corrector, a matrix circuit and so forth, and transforms the photo-electric signal from the preamplifier 6 into a video signal. The recording device 8 records the video signals in a still video floppy disc.

The image sensor 5 is supplied with a field shift pulse FS, a vertical transfer pulse $\phi V$ and a horizontal transfer pulse VH from the sensor driver 10. Upon the field shift pulse FS the signal charges stored in the pixels are sent to vertical transfer channels of the image sensor 5, wherefrom the signal charges are vertically and horizontally transferred toward the preamplifier 6 in response to the vertical and horizontal transfer pulses $\phi V$ and $\phi H$, respectively.

So as to output the field shift pulse FS as well as the vertical and horizontal transfer pulses $\phi V$ and $\phi H$, the sensor driver 10 is supplied from a synchronizing signal generator 12 with a vertical synchronizing signal VD and a horizontal synchronizing signal HD, as well as a field signal O/E (ODD/EVEN) indicating whether the image sensor 5 is in an odd field scanning mode or in an even field scanning mode. The synchronizing signal generator 12 outputs the synchronizing signals also to the video signal processing circuit 7 and the recording circuit 8.

The synchronizing signal generator 12 is controlled by a system controller 14 while the system controller 14 is supplied with the synchronizing signals from the synchronizing signal generator 12, so that the circuit blocks are synchronized with each other.

The system controller 14 is connected to a release signal generator 15, which outputs a half-depression signal S1 and a full-depression signal S2 to the system controller 14, these signals are indicative of the half-depression and the full-depression of a shutter release button 15a, respectively. The system controller 14 initializes the respective circuit blocks upon receipt of the half-depression signal S1.

The beam splitter 4 divides light from the taking lens 2 into two light beams so as to direct the one light beam toward a photometric element 17. Also on the photosensitive surface of the photometric element 17 an optical image is formed, which is then measured by a multi-pattern photometry, that is, the brightness distribution within the photographing field is detected by respective segments of the photosensitive surface arranged as a rough matrix pattern. The photometric data is sent to the photometric circuit 18, which then calculates an optimum exposure value on the basis of the photometric data, and outputs the optimum exposure value as a photometric information to the system controller 14.

An aperture driver 20 drives, upon an aperture signal from the system controller 14, a stepping motor 21, thereby to adjust the size of the aperture 3, for example stepwise, to the subject brightness. In the case of stepwise adjustment, the aperture 3 may be constituted as an aperture disc having different sized apertures arranged around on its fringe, in stead of an iris stop.

The operation of the above described electronic still camera will now be described with reference to the flow chart and timing charts of FIGS. 2 to 4.

Figure 2:
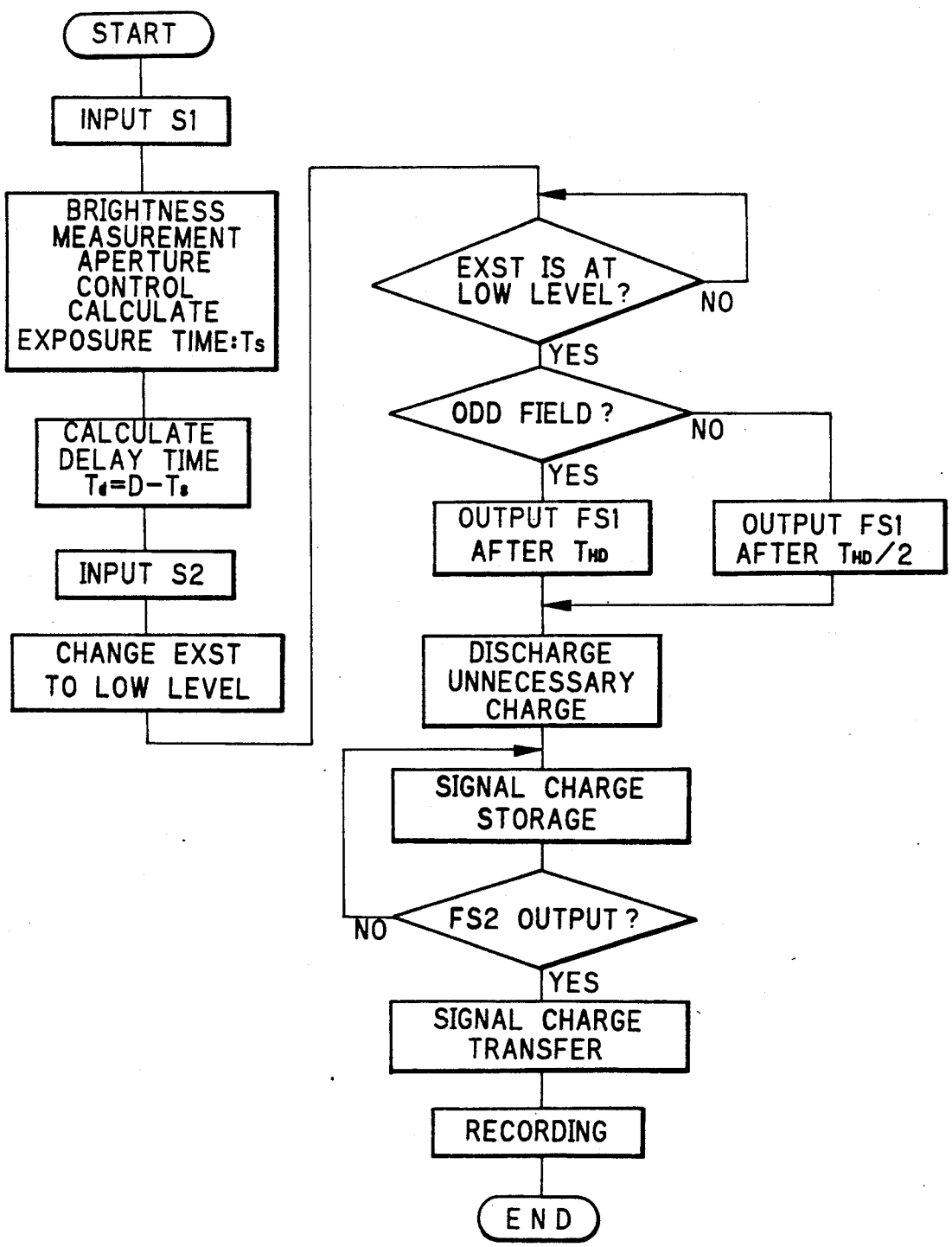
FIG. 2 is a flowchart for explaining a procedure of exposure control according to an embodiment of the invention.

FIG. 2 shows a procedure of processing executed in the system controller 14 and the sensor driver 10. When the shutter release button 15a is half depressed and the half-depression signal S1 is sent to the system controller 14, the system controller 14 accepts the photometric information from the photometric circuit 18 and calculates an aperture size and an exposure time Ts with which the optimum exposure value corresponding the present subject brightness is obtained.

Thereafter the system controller 14 subtracts the determined exposure time Ts from a predetermined constant time period D, which corresponds to the length from the start of a vertical blanking period to the end of the next vertical blanking period, for determining a delay time Td. The delay time Td is used to decide a timing of inversion of an external release signal EXST supplied from the system controller 14 to the sensor driver 10, as is described in detail below.

Figure 3:
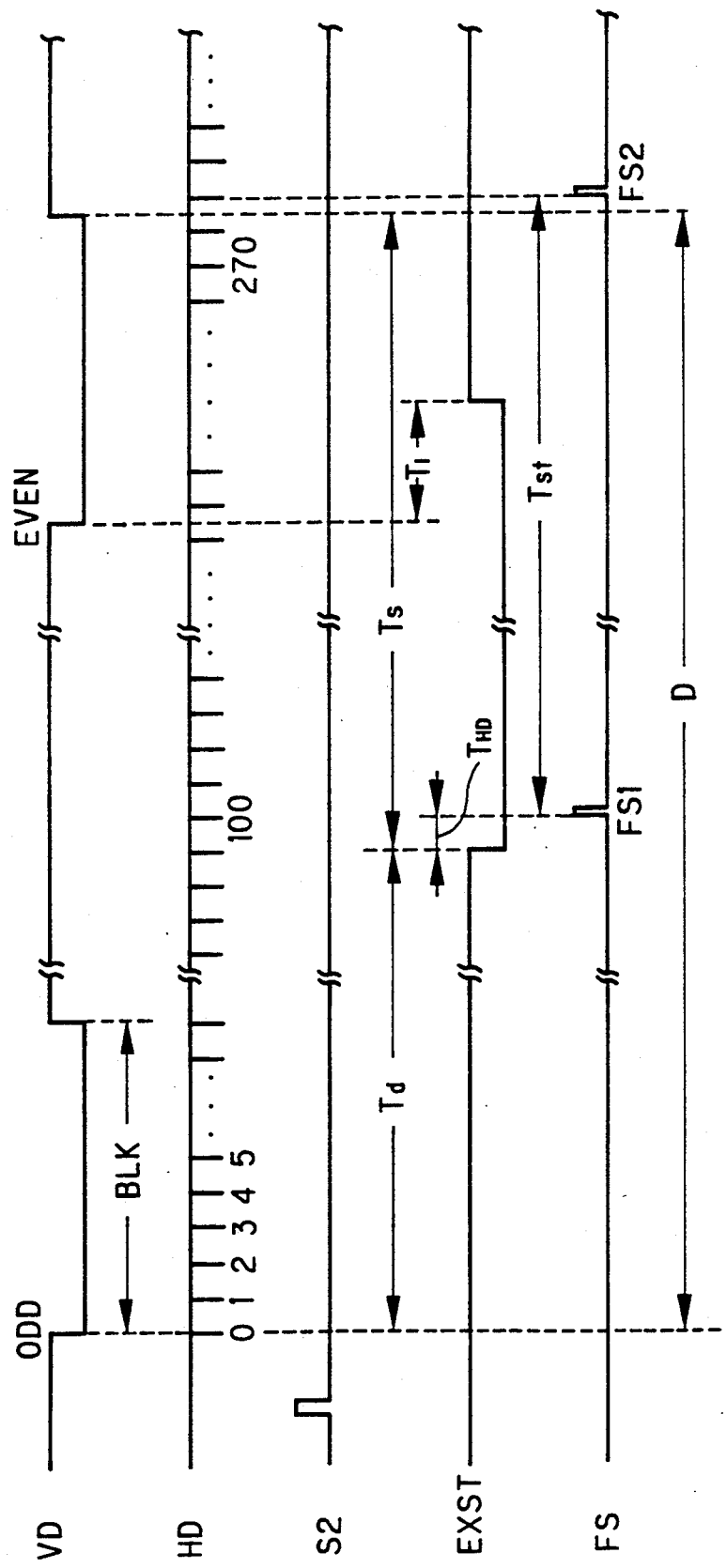
FIG. 3 shows timing charts for explaining the exposure control operation during odd field scanning mode.
Figure 4:
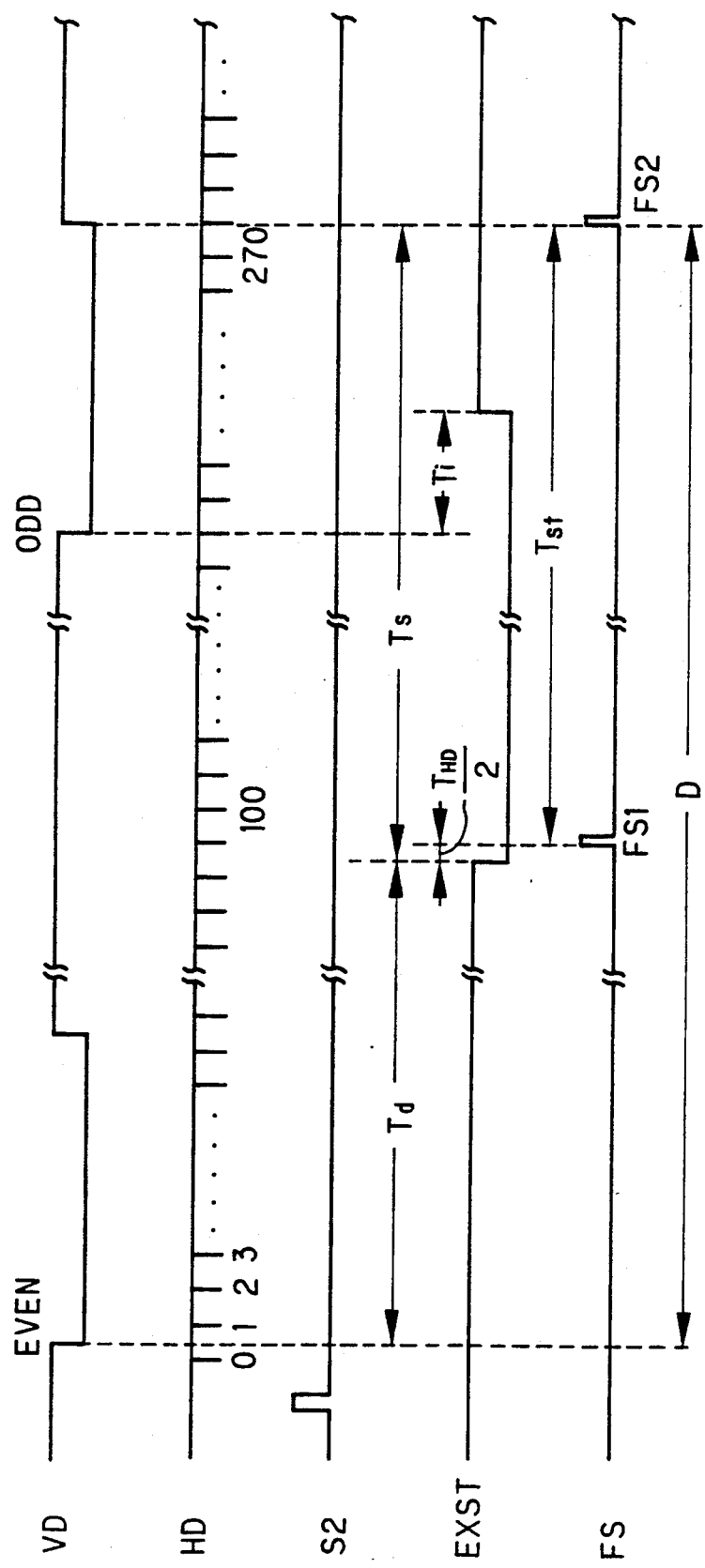
FIG. 4 shows times charts for explaining the exposure control operation during an even field scanning mode.

When the shutter release button 15a is further depressed to the full degree, the full-depression signal S2 is sent to the system controller 14 to start controlling the respective circuit blocks for exposure If the full-depression signal is generated in an even field, the exposure control is executed according to the timing chart shown in FIG. 3. That is, the system controller 14 starts clocking of the delay time Td from the start of the first vertical blanking period BLK after the full-depression signal S2, that is, from the start of an odd field scanning mode in FIG. 3. The external release signal EXST is normally maintained at a high level and is inverted to a low level at the end of the delay time Td. The falling edge of the external release signal EXST is latched by the sensor driver 10 at the timing of each horizontal synchronizing signal HD. It is to be noted that because the sensor driver 10 performs the high-speed periodical cleaning of the charge transfer channel of the image sensor 5 in the vertical blanking period BLK, the above latching operation is not effected during this period.

When the external release signal EXST changes to the low level at the end of the delay time Td, and the driver 10 latches the low level of the external release signal EXST, the driver outputs a first field shift pulse FS1 to the image sensor 5 in this moment. In response to the first field shift pulse FS1, the image sensor 5 sends at once charges having been stored in the pixels to the charge transfer channels, and these charges are rapidly abandoned as unnecessary ones through a drain of the image sensor 5. At the same moment, the image sensor 5 starts storing signal charges for imaging.

If the determined exposure time is shorter than a vertical synchronizing signal period $T_{VD}$, the external release signal EXST having changed to the low level returns to the high level after a predetermined time duration Ti from the start of the next vertical blanking period, that is, the start of the even field scanning mode in FIG. 3, wherein the time duration Ti should not be longer than 5.5 horizontal synchronizing signal period $T_{HD}$.

After the start of signal charge storage, and if the external release signal EXST has returned to the high level, the sensor driver 10 outputs a second field shift pulse FS2 to the image sensor 5 at the timing of the first horizontal synchronizing signal HD generated after the end of the vertical blanking period BLK of the next vertical synchronizing signal VD. Responsive to the second field shift pulse FS2, signal charges stored in the pixels are sent at once to the charge transfer channel, thereby completing the charge storage for imaging and thus terminating the exposure.

Accordingly, the practical charge storage time Tst corresponds to the time duration between the first and the second field shift pulses FS1 and FS2. If, for example, the first field shift pulse FS1 is generated at the 100th horizontal synchronizing signal, and the second field shift pulse FS2 is generated at the 272th horizontal synchronizing signal, the length of the charge storage time Tst is defined as follows:

$$Tst = (272 - 100) T_{HD}$$
$$= 172 T_{HD}$$

wherein $T_{HD}$ is a horizontal synchronizing signal period, namely a horizontal synchronizing signal period $T_{HD}$.

On the other hand, if the full-depression signal S2 is generated in an odd field and thus clocking of the delay time Td is effected during in the following even field, the exposure control is executed in accordance with the timing charts shown in FIG. 4, wherein it is assumed that conditions for exposure are the same as in FIG. 3.

The clocking of the delay time Td starts from the leading edge of the first vertical synchronizing signal VD after the full-depression signal S2, as in the case of FIG. 3, but that is the start of an even field scanning mode in this case. The external release signal EXST changes to the low level after the delay time Td from the start of the even field scanning mode. As obvious from FIGS. 3 and 4, the horizontal synchronizing signal HD is displaced by ½ phase ($T_{HD}/2$) thereof relative to the vertical synchronizing signal VD between the even field and the odd field. Accordingly, the first field shift pulse FS1 is generated at a timing displaced by $T_{HD}/2$ from the falling edge of the external release signal EXST in FIG. 4. The timing of the first field shift pulse FS1 corresponds to that of the 99th horizontal synchronizing signal HD, at which unnecessary charges are rapidly discharged through the drain, and the image sensor 5 begins to store signal charges.

Also in this case, the charge storage is terminated upon a horizontal synchronizing signal generated immediately after the end of the vertical blanking period of the next vertical synchronizing signal, whereby the charge storage time Tst is determined. Because the time Tst is defined based on the timing between the pulses FS1 and FS2 is analogous to the case of FIG. 3, and the timing of the pulse FS1 corresponds to the 99th horizontal synchronizing signal, whereas the timing of the pulse FS2 to the 271th horizontal synchronizing signal, the time Tst can be defined as follows:

$$Tst = (271 - 99) T_{HD}$$
$$= 172 T_{HD}$$

Therefore, the charge storage time Tst does not differ from each other between the even and odd field under the same exposure condition.

On the contrary, if the field shift pulse FS1 were to be generated at the timing of inversion of the external release signal EXST in FIG. 4, the time Tst would become as follows:

$$Tst = (271 - 98.5) T_{HD}$$
$$= 172.5 T_{HD}$$

Therefore, the time Tst could not be N times as long as a horizontal synchronizing signal period $T_{HD}$, (N=an integer), and also the deviation of the charge storage time between the even and odd field would be irrecoverable.

It is to be noted that the above explanations are based on an example where the exposure time is shorter than a vertical synchronizing signal period $T_{VD}$. If the exposure time is determined to be longer than a vertical synchronizing signal period $T_{VD}$, the external release signal EXST does not return to the high level until an appropriate time so that the second field shift pulse FS2 will be inhibited for an appropriate time, which supposes that the second field shift pulse FS2 is to be generated only when the external release signal EXST is at high level. Since the field shift pulse is to be generated at the timing of the first horizontal synchronizing signal immediately after the end of a vertical blanking period, the charge storage time Tst' that is longer than a vertical synchronizing signal period can be defined as $Tst' = N \times T_{HD} M \times T_{VD}$ (wherein N and M are an integer).

Therefore, also in this case, the first field shift pulse FS1 can be generated in the same way as above.

As described so far, according to the invention, the charge storage time of an image sensor for an electronic still camera can be set exactly N times as long as a horizontal synchronizing signal period according to the subject brightness. Because this control is performed by making use of pulses originally generated for driving the image sensor, no other complicated circuit nor signal lines is needed therefor, so that the cost for the above improvement will not be expensive.

Furthermore, a trigger signal for starting the charge storage is relatively disposed by ½ phase of the horizontal synchronizing signal depending on whether the charge storage time is to start in an odd or even field, so that it is possible to pick up an image with using the same charge storage time under the same exposure condition independently of whether the exposure control is carried out in an odd or even field.

While the invention has been described in detail above with reference to a preferred embodiment, various modifications with the scope and spirit of the invention will ne apparent to people of working skill in this technological field Thus, the invention should be considered as limited only by the scope of the appended claims

What is claimed is:

1. A method of controlling an electronic shutter for an electronic video camera in which a first operation for discharging unnecessary charges from a solid state imaging device is executed, and a second operation for reading out signal charges having been stored in the solid state imaging device since the first operation is executed during a vertical scanning period, said signal charges being processed as a video signal said method comprising the steps of:
    generating an external trigger signal for instructing the first operation;
    latching said external trigger signal by latch pulses generated in synchronism with the horizontal synchronizing signal for the video signal; and
    starting the first operation at the timing when said external trigger signal is latched, so that the timing of the start of the first operation is relatively displaced by a half of horizontal synchronizing signal period between an even field and an odd field of the video signal.

2. A method of controlling an electronic shutter as defined in claim 1, wherein said electronic video camera comprises a still video camera.

3. A method of controlling an electronic shutter as defined in claim 2, wherein said external trigger signal is generated in response to a shutter release operation with a delay time, said delay time being determined in accordance with the subject brightness.

4. A method of controlling an electronic shutter as defined in claim 3, wherein said delay time is clocked with reference to a vertical synchronizing signal for the video signal.

5. A method of controlling an electronic shutter as defined in claim 4, further comprising the step of generating a trigger signal for starting the second operation at the timing of a first horizontal synchronizing signal in the vertical scanning period.

6. A method of controlling an electronic shutter as defined in claim 5, wherein said external trigger signal is a binary signal, and the first operation is started when a change of said binary signal from a first level to a second level is latched, whereas the second operation is inhibited so long as said binary signal is at said second level.

7. An apparatus for controlling an electronic shutter for an electronic still video camera in which a first operation for discharging unnecessary charges from a solid state imaging device is executed, and then a second operation for reading out signal charges having been stored in the solid state imaging device since the first operation is executed during a vertical scanning period, said signal charges being processed as a video signal, said apparatus comprising:

means for generating an external trigger signal for instructing the first operation;

means for latching said external trigger signal by latch pulses generated in synchronism with the horizontal synchronizing signal for the video signal; and means for starting the first operation at the timing when said external trigger signal is latched, so that the timing of the start of the first operation is relatively displaced by a half of horizontal synchronizing signal period between an even field and an odd field of the video signal.

8. An apparatus for controlling an electronic shutter for an electronic still video camera, comprising:

a solid state imaging device;

means for determining an exposure time;

synchronizing signal generating means for generating the horizontal and the vertical synchronizing signal;

means for generating a first trigger signal for starting the discharge of unnecessary charges from said solid state imaging device in accordance with said exposure time;

latching means for latching said first trigger signal in synchronism with the horizontal synchronizing signal and supplying said latched trigger signal to said solid state imaging device; and means for outputting a second trigger signal to said solid state imaging device with reference to the vertical synchronizing signal for reading out signal charges stored in said solid state imaging device so as to process said signal charges as a video signal

* * * * *